United States Patent
Oh et al.

(10) Patent No.: US 11,891,523 B2
(45) Date of Patent: Feb. 6, 2024

(54) COMPOSITE NEGATIVE ELECTRODE ACTIVE MATERIAL, METHOD OF MANUFACTURING THE SAME, AND NEGATIVE ELECTRODE INCLUDING THE SAME

(71) Applicant: LG ENERGY SOLUTION, LTD., Seoul (KR)

(72) Inventors: Il Geun Oh, Daejeon (KR); Yong Ju Lee, Daejeon (KR); Dong Hyuk Kim, Daejeon (KR); Young Jae Kim, Daejeon (KR); Ye Lin Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 142 days.

(21) Appl. No.: 17/639,215

(22) PCT Filed: Sep. 28, 2020

(86) PCT No.: PCT/KR2020/013218
§ 371 (c)(1),
(2) Date: Feb. 28, 2022

(87) PCT Pub. No.: WO2021/066458
PCT Pub. Date: Apr. 8, 2021

(65) Prior Publication Data
US 2022/0325105 A1  Oct. 13, 2022

(30) Foreign Application Priority Data
Sep. 30, 2019 (KR) .......................... 10-2019-0120840

(51) Int. Cl.
*H01M 4/48* (2010.01)
*C09C 1/30* (2006.01)
(Continued)

(52) U.S. Cl.
CPC .............. *C09C 1/3054* (2013.01); *H01M 4/48* (2013.01); *H01M 4/583* (2013.01); *H01M 4/625* (2013.01);
(Continued)

(58) Field of Classification Search
CPC ........ H01M 4/48; H01M 4/583; H01M 4/625; H01M 2004/021; H01M 2004/027
See application file for complete search history.

(56) References Cited

U.S. PATENT DOCUMENTS

2009/0004566 A1   1/2009   Shirane et al.
2010/0261050 A1   10/2010   Kang et al.
(Continued)

FOREIGN PATENT DOCUMENTS

CN     101513997 A     8/2009
CN     103702929 A     4/2014
(Continued)

OTHER PUBLICATIONS

Britto et al., "Thermal Degradation of Carboxymethylcellulose in Different Sally Forms", Thermochimica Acta, vol. 494, 2009, pp. 115-122.
(Continued)

*Primary Examiner* — Jane J Rhee
(74) *Attorney, Agent, or Firm* — Birch, Stewart, Kolasch & Birch, LLP (57) ABSTRACT

A composite negative electrode active material, which includes: a silicon-based core particle; an outer carbon coating layer positioned on a surface of the silicon-based core particle; first single-walled carbon nanotubes in contact with the outer carbon coating layer, wherein the first single-walled carbon nanotubes protrude from the outer carbon coating layer; a conductive structure spaced apart from the outer carbon coating layer, wherein the conductive structure
(Continued)

includes at least one second single-walled carbon nanotubes; and a crosslinking material bonded to the first single-walled carbon nanotube and at least one of the second single-walled carbon nanotubes. The at least one of the second single-walled carbon nanotubes is crosslinked with the first single-walled carbon nanotube by the crosslinking material, and wherein the conductive structure and the first single-walled carbon nanotube are connected to each other.

15 Claims, 2 Drawing Sheets (51) Int. Cl.
  *H01M 4/583* (2010.01)
  *H01M 4/62* (2006.01)
  *H01M 4/02* (2006.01)
(52) U.S. Cl.
  CPC .................... *H01M 2004/021* (2013.01); *H01M 2004/027* (2013.01)

(56) References Cited

U.S. PATENT DOCUMENTS

| | | | |
|---|---|---|---|
| 2013/0059203 | A1 | 3/2013 | Hong et al. |
| 2014/0087268 | A1 | 3/2014 | Kim et al. |
| 2014/0127558 | A1 | 5/2014 | Kang et al. |
| 2014/0170485 | A1 | 6/2014 | Lee et al. |
| 2015/0004488 | A1 | 1/2015 | Abdelsalam et al. |
| 2015/0044571 | A1 | 2/2015 | Abdelsalam et al. |
| 2015/0236340 | A1 | 8/2015 | Jung et al. |
| 2015/0318542 | A1 | 11/2015 | Morozumi et al. |
| 2016/0013481 | A1 | 1/2016 | Jeong et al. |
| 2016/0043390 | A1 | 2/2016 | Shin et al. |
| 2016/0172665 | A1 | 6/2016 | Zhou et al. |
| 2016/0190597 | A1 | 6/2016 | Kim et al. |
| 2016/0197343 | A1 | 7/2016 | Jeong et al. |
| 2018/0138514 | A1 | 5/2018 | Schauer et al. |
| 2020/0058941 | A1 | 2/2020 | Hayashi et al. |
| 2020/0161661 | A1 | 5/2020 | Schauer et al. |
| 2020/0280061 | A1 | 9/2020 | Deng et al. |

FOREIGN PATENT DOCUMENTS

| | | | |
|---|---|---|---|
| CN | 103891014 A | 6/2014 | |
| CN | 104094453 A | 10/2014 | |
| CN | 105702941 A | 6/2016 | |
| CN | 108155350 A | 6/2018 | |
| CN | 108461723 A | 8/2018 | |
| CN | 109638229 A | 4/2019 | |
| JP | 2004-349056 A | 12/2004 | |
| JP | 2007-165078 A | 6/2007 | |
| JP | 2007-165079 A | 6/2007 | |
| JP | 2012-221672 A | 11/2012 | |
| JP | 2015-508934 A | 3/2015 | |
| JP | 2015-118911 A | 6/2015 | |
| JP | 2020-507195 A | 3/2020 | |
| KR | 10-2011-0124728 A | 11/2011 | |
| KR | 10-2013-0016727 A | 2/2013 | |
| KR | 10-1396521 B1 | 5/2014 | |
| KR | 10-2016-0008041 A | 1/2016 | |
| KR | 10-1586015 B1 | 1/2016 | |
| KR | 10-2016-0018267 A | 2/2016 | |
| KR | 10-1607232 B1 | 3/2016 | |
| KR | 10-2016-0081688 A | 7/2016 | |
| KR | 10-2016-0085089 A | 7/2016 | |
| KR | 10-1670353 B1 | 11/2016 | |
| KR | 10-2017-0074030 A | 6/2017 | |
| KR | 10-2018-0001066 A | 1/2018 | |
| WO | WO 2014/054792 A1 | 4/2014 | |
| WO | WO 2018/146865 A1 | 8/2018 | |
| WO | WO 2019/022318 A1 | 1/2019 | |
| WO | WO 2019/114556 A1 | 6/2019 | |

OTHER PUBLICATIONS

Extended European Search Report for European Application No. 20872176.1, dated Sep. 5, 2022.
Li et al., "Recent Progress on Silicon-Based Anode Materials for Practical Lithium-Ion Battery Applications", Energy Storage Materials, vol. 15, 2018, pp. 422-446.
Lion, "Ketjenblack Highly Electro-Conductive Carbon Black", Lion Specialty Chemicals Co., Ltd., Sep. 7, 2016, pp. 1-3.
Su et al., "High Cycling Performance Si/CNTs@C Composite Material Prepared by Spray-Drying Method", Ionics, vol. 23, No. 2, Published Online Dec. 6, 2016, pp. 405-410.
Terranova et al., "Si/C Hybrid Nanostructures for Li-Ion Anodes: An Overview", Journal of Power Sources, vol. 246, 2014, pp. 167-177.
International Search Report for PCT/KR2020/013218 dated Jan. 13, 2021.
Chen et al., "Si/MgO composite anodes for Li-ion batteries," Rare Metals, vol. 30, No. 2, 2011, pp. 166-169.
Indian Office Action for Indian Application No. 202217014855, dated Nov. 10, 2023, with an English translation.

COMPOSITE NEGATIVE ELECTRODE ACTIVE MATERIAL, METHOD OF MANUFACTURING THE SAME, AND NEGATIVE ELECTRODE INCLUDING THE SAME

CROSS-REFERENCE TO RELATED APPLICATION

This application claims priority to and the benefit of Korean Patent Application No. 10-2019-0120840, filed on Sep. 30, 2019, the disclosure of which is incorporated herein by reference in its entirety.

TECHNICAL FIELD

The present invention relates to a composite negative electrode active material, a method of manufacturing the same, and a negative electrode including the same.

BACKGROUND ART

Recently, with the rapid spread of electronic devices using batteries, such as mobile phones, laptop computers, and electric vehicles, the demand for secondary batteries that are small, lightweight, and have relatively high capacity is rapidly increasing. In particular, lithium secondary batteries are lightweight and have high energy density and thus are in the spotlight as a driving power source for portable devices. Accordingly, there are on-going active research and development efforts to improve the performance of lithium secondary batteries.

In general, lithium secondary batteries include a positive electrode, a negative electrode, a separator interposed between the positive electrode and the negative electrode, an electrolyte, an organic solvent, and the like. In addition, in each of the positive electrode and the negative electrode, an active material layer including a positive electrode active material or negative electrode active material may be formed on a current collector. In the positive electrode, a lithium-containing metal oxide such as $LiCoO_2$ or $LiMn_2O_4$ is generally used as a positive electrode active material, and accordingly, in the negative electrode, a carbon-based active material or silicon-based negative electrode active material that does not contain lithium is used as a negative electrode active material.

In particular, among the negative electrode active materials, silicon-based negative electrode active materials are attracting attention because the silicon-based negative electrode active materials have about 10-fold higher capacity than carbon-based negative electrode active materials, and due to the high capacity, there is an advantage that a high energy density can be realized even with a thin electrode. However, the silicon-based negative electrode active materials have problems such as the volume expansion caused by charging and discharging, the resulting cracking/damaging of active material particles, and the resulting degradation of lifetime characteristics and thus have not been widely used.

In particular, the silicon-based negative electrode active materials have a problem in that as the volume expands or contracts due to charging and discharging, the distance between active material particles increases and an electrical short circuit occurs, causing charge transfer pathways to disappear and lithium ions to be trapped, and as a result, capacity may be reduced and a reduction in lifetime may be accelerated.

Therefore, there is a need to develop a secondary battery which has improved lifetime characteristics and in which the high capacity and energy density of a silicon-based negative electrode active material are realized.

Korean Patent Publication No. 10-2017-0074030 relates to a negative electrode active material for a lithium secondary battery, a method of manufacturing the same, and a lithium secondary battery including the same, and although a negative electrode active material including a porous silicon-carbon composite is disclosed, there are limitations in solving the above-described problems.

RELATED-ART DOCUMENT

Patent Document

Korean Patent Publication No. 10-2017-0074030

DISCLOSURE

Technical Problem

The present invention is directed to providing a composite negative electrode active material in which a silicon-based active material and which is capable of effectively preventing the occurrence of an electrical short circuit in the active material due to charging and discharging and improving lifetime characteristics.

In addition, the present invention is directed to providing a method of manufacturing the composite negative electrode active material.

In addition, the present invention is directed to providing a negative electrode including the composite negative electrode active material.

Technical Solution

One aspect of the present invention provides a composite negative electrode active material which includes: a silicon-based core particle; an outer carbon coating layer positioned on a surface of the silicon-based core particle; first single-walled carbon nanotubes in contact with the outer carbon coating layer, wherein the first single-walled carbon nanotubes protrude from the outer carbon coating layer; a conductive structure spaced apart from the outer carbon coating layer, wherein the conductive structure includes at least one second single-walled carbon nanotubes; and a crosslinking material bonded to the first single-walled carbon nanotube and at least one of the second single-walled carbon nanotubes, wherein the at least one of the second single-walled carbon nanotubes is crosslinked with the first single-walled carbon nanotube by the crosslinking material, and wherein the conductive structure and the first single-walled carbon nanotube are connected to each other.

Another aspect of the present invention provides a method of manufacturing the above-described composite negative electrode active material, which includes: mixing silicon-based core particles, a precursor material for forming an outer carbon coating layer, two or more single-walled carbon nanotubes, and a crosslinking material to form a mixture; and thermally treating the mixture.

Still another aspect of the present invention provides a negative electrode which includes: a negative electrode current collector; and a negative electrode active material layer formed on the negative electrode current collector, wherein the negative electrode active material layer includes: a negative electrode material including the above-described composite negative electrode active material; a binder; and a conductive material.

Advantageous Effects

A composite negative electrode active material of the present invention includes: a silicon-based core particle; an outer carbon coating layer positioned on the silicon-based core particle; first single-walled carbon nanotubes in contact with the outer carbon coating layer and protruding from the outer carbon coating layer; a conductive structure spaced apart from the outer carbon coating layer and including second single-walled carbon nanotubes; and a crosslinking material bonded to the first single-walled carbon nanotube and at least one of the second single-walled carbon nanotubes, wherein the at least one of the second single-walled carbon nanotubes is crosslinked with the first single-walled carbon nanotube by the crosslinking material, and thus the conductive structure and the first single-walled carbon nanotube are connected to each other. The conductive structure is connected to the outer carbon coating layer by a crosslinked structure of the first single-walled carbon nanotube and the second single-walled carbon nanotube and fixed. Due to being connected to the outer carbon coating layer and fixed, the conductive structure uniformly and stably forms a conductive network in a negative electrode and thus improves the lifetime characteristics of the negative electrode and a secondary battery. In addition, since the conductive structure forms a conductive network while being exposed on the outside of the composite negative electrode active material, the occurrence of an electrical short circuit between the active materials is prevented, and therefore, even when the volume of the active material expands or contracts due to charging and discharging, the occurrence of an electrical short circuit between the active materials can be prevented. The crosslinking material serves as a bridge agent for crosslinking the two or more single-walled carbon nanotubes (the first single-walled carbon nanotube(s) and/or the second single-walled carbon nanotube(s)) and may help the single-walled carbon nanotubes to form the conductive network more stably and uniformly.

In addition, according to a method of manufacturing the composite negative electrode active material of the present invention, the composite negative electrode active material is manufactured by mixing silicon-based core particles, a precursor material for forming an outer carbon coating layer, two or more single-walled carbon nanotubes, and a crosslinking material to form a mixture; and thermally treating the mixture and thus forming a composite. With this process, it is possible to manufacture the above-described composite negative electrode active material, and the formation of a composite by heat treatment enables a conductive structure including second single-walled carbon nanotubes to be attached to an outer carbon coating layer through the first single-walled carbon nanotube and enables the conductive structure to form a conductive network between the active materials.

MODES OF THE INVENTION

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

The terms used herein are only used to describe exemplary embodiments, and are not intended to limit the present invention. Singular expressions include plural expressions unless the context clearly indicates otherwise.

It will be understood that the terms "comprising", "including", and/or "having", when used herein, specify the presence of stated features, integers, steps, elements, and/or groups thereof and do not preclude the presence or addition of one or more other features, integers, steps, elements, and/or groups thereof.

As used herein, an average particle diameter ($D_{50}$) may be defined as a particle diameter corresponding to a cumulative volume of 50% in the particle diameter distribution curve. The average particle diameter ($D_{50}$) may be measured using, for example, a laser diffraction method. The laser diffraction method generally allows for the measurement of a particle diameter ranging from a submicron level to several millimeters and is capable of producing a result having high reproducibility and high resolution.

Hereinafter, the present invention will be described in detail.

<Composite Negative Electrode Active Material>

One aspect of the present invention provides a composite negative electrode active material. The composite negative electrode active material can be appropriately used for a lithium secondary battery.

Hereinafter, a composite negative active material of the present invention will be described in detail with reference to the drawings. In giving reference numerals to elements of each drawing, the same elements may have the same numerals as much as possible even when the elements are illustrated in different drawings. In addition, in describing the present invention, when it is determined that a detailed description of a related known configuration or function may obscure the gist of the present invention, the detailed description may be omitted.

Figure 1:
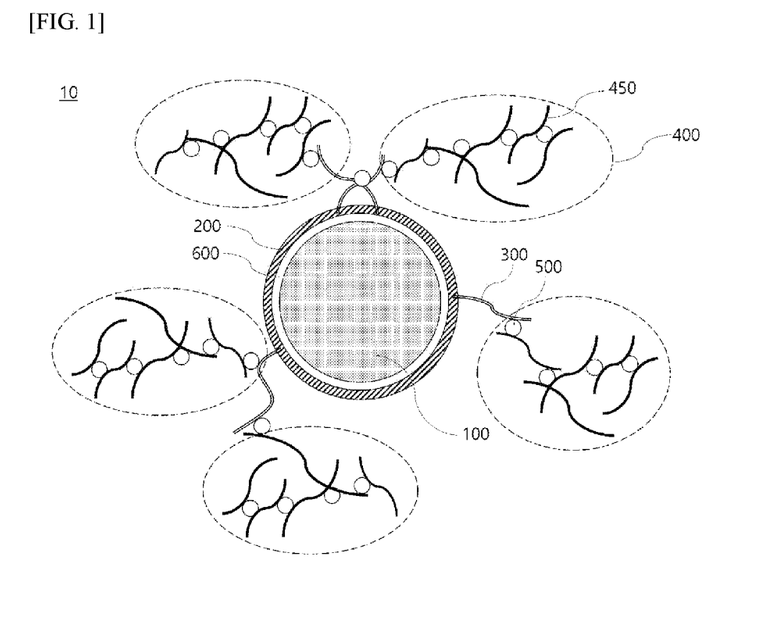
FIG. 1 is a cross-sectional view for schematically illustrating a composite negative electrode active material of the present invention.

FIG. 1 is a cross-sectional view for schematically illustrating a composite negative electrode active material 10 of the present invention.

Referring to FIG. 1, a composite negative electrode active material 10 of the present invention includes: a silicon-based core particle 100; an outer carbon coating layer 200 positioned on the silicon-based core particle 100; first single-walled carbon nanotubes 300 in contact with the outer carbon coating layer 200 and protruding from the outer carbon coating layer 200; a conductive structure 400 spaced apart from the outer carbon coating layer 200 and including second single-walled carbon nanotubes 450; and a crosslinking material 500 bonded to the first single-walled carbon nanotube 300 and at least one of the second single-walled carbon nanotubes 450, wherein the at least one of the second single-walled carbon nanotubes 450 is crosslinked with the first single-walled carbon nanotube 300 by the crosslinking material 500, and thus the conductive structure 400 and the first single-walled carbon nanotube 300 are connected to each other.

Silicon-based negative electrode active materials are generally known to have about 10-fold higher capacity than carbon-based active materials, and accordingly, when a silicon-based negative electrode active material is used in a negative electrode, it is expected that a thin-film electrode having a high level of energy density despite having a small thickness can be implemented. However, the silicon-based negative electrode active materials have a problem in that as the volume expands or contracts due to the intercalation/deintercalation of lithium during charging and discharging, a lifetime is reduced. In particular, when the volume of the silicon-based active materials expands or contracts due to charging and discharging, since the distance between the active materials increases, electrical contact decreases and an electrical short circuit occurs, and accordingly, since charge transfer pathways disappear and lithium ions are trapped, the lifetime and capacity of a negative electrode may be rapidly reduced.

Therefore, the composite negative electrode active material of the present invention includes a silicon-based core particle, an outer carbon coating layer positioned on the silicon-based core particle, first single-walled carbon nanotubes (hereinafter referred to as first SWCNTs) partially attached to the outer carbon coating layer, a conductive structure including second single-walled carbon nanotubes (hereinafter referred to as second SWCNTs), and a crosslinking material, and the first SWCNT may be crosslinked with at least one of the second SWCNTs by the crosslinking material, and thus the conductive structure, which is spaced apart from the outer carbon coating layer, may be connected to the outer carbon coating layer by the first SWCNT and fixed. Due to being connected to the outer carbon coating layer and fixed, the conductive structure uniformly and stably forms a conductive network in a negative electrode and thus improves the lifetime characteristics of the negative electrode and a secondary battery. In addition, the conductive structure forms a conductive network while being exposed on the outside of the composite negative electrode active material which thus prevents the occurrence of an electrical short circuit between the active materials, and therefore, even when the volume of the active material expands or contracts due to charging and discharging, the occurrence of an electrical short circuit between the active materials can be prevented. The crosslinking material serves as a bridge agent for crosslinking the two or more SWCNTs (the first SWCNT(s) and/or the second SWCNT(s)) and may help the SWCNTs to form the conductive network more stably and uniformly.

In addition, since the conductive structure is connected to the outer carbon coating layer and fixed while being spaced apart from the outer carbon coating layer, even when the volume of the silicon-based core particle is expanded due to charging and discharging, the occurrence of an electrical short circuit between the active materials is prevented due to a conductive network formed by the conductive material, and therefore, the lifetime characteristics of a negative electrode are improved, and resistance is reduced.

In addition, according to the present invention, since the conductive structure is connected to the outer carbon coating layer by the first SWCNT and fixed, when the composite negative electrode active material is included in a negative electrode, the conductive structure is uniformly disposed in the negative electrode, and therefore, a uniform and stable conductive network is formed in the negative electrode.

The silicon-based core particle 100 is capable of intercalating/deintercalating lithium and may function as a core particle of the composite negative electrode active material.

The silicon-based core particle 100 may include a compound represented by Chemical Formula 1.

$M_xSiO_y$   [Chemical Formula 1]

In Chemical Formula 1, M may be one or more selected from the group consisting of Li, Mg, and Al, and $0 \leq x \leq 0.4$, and $0 \leq y < 2$.

When the compound is $SiO_2$ (i.e., x=0 and y=2 in Chemical Formula 1), since $SiO_2$ does not react with lithium ions and does not store lithium, it is preferable that in Chemical Formula 1, y satisfies the above-described range. Specifically, in Chemical Formula 1, $0.5 \leq y \leq 1.5$ in the interest of the structural stability of the active material.

In Chemical Formula 1, M may be included in the interest of improving the efficiency of the active material by lowering the proportion of an irreversible phase (e.g., $SiO_2$) in the silicon-based core particle and may be one or more selected from the group consisting of Li, Mg, and Al, preferably one or more selected from the group consisting of Li and Mg, and more preferably Mg. In Chemical Formula 1, $0 < x \leq 0.5$.

The average particle diameter ($D_{50}$) of the silicon-based core particle 100 may be 1 μm to 10 μm and preferably 3 μm to 8 μm in the interest of ensuring the structural stability of the active material during charging and discharging, better maintaining electrical contact when the silicon-based core particle 100 is used with SWCNTs, and preventing the problems that the degree of volume expansion/contraction increases as the particle diameter becomes excessively large and initial efficiency decreases due to an excessively small particle diameter.

The silicon-based core particle 100 may be present in an amount of 90 wt % to 99.9 wt % and preferably 93 wt % to 99 wt % in the composite negative electrode active material. When this range is satisfied, it is preferable in that the capacity of a negative electrode can be improved, and since a conductive network to be described below can be smoothly formed by the SWCNTs and the crosslinking material, the occurrence of an electrical short circuit due to the volume expansion of the active material can be prevented and lifetime characteristics can be improved.

The outer carbon coating layer 200 is positioned on the silicon-based core particle 100 and allows the volume expansion/contraction of the silicon-based core particle 100 due to charging and discharging to be appropriately controlled, and by being connected to the conductive structure 400 to be described below through the first SWCNT 300, allows the silicon-based core particle 100 and the conductive structure 400 to be combined as a composite.

The outer carbon coating layer 200 includes a carbon element (C). In addition, the outer carbon coating layer 200 may include an oxygen element (O), hydrogen (H), and the like in addition to the carbon element (C).

Specifically, the outer carbon coating layer 200 may include oxygen (O), and specifically, the oxygen may be present in an amount of 35 wt % to 55 wt % in the outer carbon coating layer 200. Specifically, the outer carbon coating layer 200 may be formed by mixing silicon-based core particles, two or more SWCNTs, a crosslinking material, and a precursor material for forming an outer carbon coating layer and then thermally treating the mixture, and as a result of the heat treatment, the oxygen content in the precursor material for forming an outer carbon coating layer may be reduced. When the composite negative electrode active material 10 includes an outer carbon coating layer 200 whose oxygen content has been adjusted to be within the above-described range, since it is easy to allow the first SWCNT 300 to protrude from the outer carbon coating layer 200 while being in contact with the same, a structure connecting the outer carbon coating layer 200 and the conductive structure 400 can be easily formed, and therefore, a conductive network can be more uniformly and stably formed between the composite negative electrode active materials by the conductive structure 400. In addition, when the composite negative electrode active material 10 includes an outer carbon coating layer 200 whose oxygen content has been adjusted to be within the above-described range, since two or more SWCNTs (the first SWCNT(s) and/or the second SWCNT(s)) can be smoothly crosslinked to each other by the crosslinking material 500, a conductive network can be stably formed.

Preferably, the oxygen is present in an amount of 40 wt % to 55 wt % in the outer carbon coating layer, and when this range is satisfied, a part of the first SWCNT 300 can be appropriately attached to the outer carbon coating layer 200 so that a part of the body of the first SWCNT 300 protrudes or is spaced apart from the outer carbon coating layer, and the formation of a conductive network that has a high degree of freedom and high flexibility is enabled by the connection of the first SWCNT 300 and the conductive structure 400.

The above-described oxygen content may be realized through the selection of a precursor material for forming an outer carbon coating layer and the control of a heat-treatment temperature.

The oxygen content in the outer carbon coating layer 200 can be measured by X-ray photoelectron spectroscopy (XPS).

The outer carbon coating layer 200 may be present in an amount of 0.001 wt % to 0.2 wt % and preferably 0.01 wt % to 0.1 wt % in the composite negative electrode active material 10, and when this range is satisfied, it is preferable in that the SWCNTs can be sufficiently attached to the outer carbon coating layer so that a part of the body of the SWCNTs can protrude and be spaced apart from the outer carbon coating layer.

The composite negative electrode active material includes first SWCNTs 300. As shown in FIG. 1, the first SWCNT 300 is in contact with the outer carbon coating layer 200 and protrudes from the outer carbon coating layer 200. Accordingly, the first SWCNT 300 enables the conductive structure 400, which is spaced apart from the outer carbon coating layer 200, to be connected to the outer carbon coating layer 200 by the crosslinking material 500 and fixed.

Single-walled carbon nanotubes (SWCNTs) are a type of carbon nanotube having a single cylindrical wall, and have a fiber shape. Compared to multi-walled carbon nanotubes (hereinafter referred to as MWCNTs), the SWCNTs have a long fiber length because they are not cut during growth, and have high degrees of graphitization and crystallinity.

As shown in FIG. 1, the first SWCNT 300 may be in contact with the outer carbon coating layer 200 and may protrude from the outer carbon coating layer 200. In addition, the first SWCNT 300 may be in contact with the outer carbon coating layer 200 and may protrude in such a manner that a part of the body of the first SWCNT 300 is spaced apart from the outer carbon coating layer 200. Specifically, as shown in FIG. 1, a part of the body of the first SWCNT 300 may be in contact with or attached to the outer carbon coating layer 200, while the remainder of the body that is not in contact with the outer carbon coating layer 200 is spaced apart or protruding from the outer carbon coating layer 200.

The average length of the first SWCNT 300 may be 1 μm or more, preferably 3 μm or more, more preferably 4 μm or more, and even more preferably in the range of 4.5 μm to 10 μm. When this range is satisfied, it is preferable in that a sufficient length for facilitating the partial attachment to the outer carbon coating layer 200 and the connection and crosslinking with the conductive structure 400 can be secured and thus a conductive network formed between the active materials by the conductive structure 400 can be easily maintained.

In the present specification, the average length of the first SWCNT 300 is measured as follows. A solution in which the first SWCNTs and carboxymethylcellulose (CMC), in a weight ratio of 40:60, are added to water (solid content is 1 wt % based on the total weight of the solution) is diluted 1,000× in water. Subsequently, 20 mL of the diluted solution is passed through a filter, and the filter containing the SWCNT residue is dried. After 100 images of the dried filter are taken with an SEM, the lengths of the first SWCNTs are measured using ImageJ) software, and an average value of the lengths is taken as the average length of the first SWCNTs.

The average diameter of the first SWCNT 300 may be in the range of 0.1 nm to 15 nm and preferably 2 nm to 7 nm. When the average diameter of the first SWCNT satisfies this range, it is preferable in that the breakage of the first SWCNT can be prevented and high flexibility can be secured.

In the present specification, the average diameter of the first SWCNT 300 is measured as follows. A solution in which the first SWCNTs and CMC, in a weight ratio of 40:60, are added to water (solid content is 1 wt % based on the total weight of the solution) is diluted 1,000× in water. One drop of the diluted solution is applied onto a transmission electron microscope (TEM) grid, and the TEM grid is dried. The dried TEM grid is observed with a TEM instrument (H7650 manufactured by Hitachi High-Tech Corporation), and the average diameter of the first SWCNTs is measured.

The ratio of the average length and average diameter of the first SWCNT 300 may be 500:1 or more, preferably in the range of 500:1 to 10,000:1, and more preferably in the range of 750:1 to 2,000:1, and when this range is satisfied, it is preferable in that the first SWCNT has high conductivity, breakage is prevented, and flexibility is improved.

The composite negative electrode active material includes a conductive structure 400. As shown in FIG. 1, the number of conductive structures 400 included in the composite negative electrode active material may be one or more.

The conductive structure 400 may be spaced apart from the outer carbon coating layer 200.

The conductive structure 400 includes a second SWCNT 450. The number of the second SWCNTs 450 included in the conductive structure 400 may be one or more, and preferably, a plurality of the second SWCNTs 450 are included in the conductive structure 400. As will be described below, two or more second SWCNTs 450 may be crosslinked with each other by the crosslinking material 500.

As will be described below, the conductive structure 400 may be connected to the outer carbon coating layer 200 by a crosslinked structure between at least one of the second SWCNTs 450 and the first SWCNT 300, and may be fixed by the first SWCNT 300. Due to the long fiber length, high flexibility, and high crystallinity of the SWCNTs, a conductive network that helps the electrical contact between the composite negative electrode active materials can be formed by the conductive structure. Accordingly, in the composite negative electrode active material of the present invention, even when the volume of the active material in a negative electrode is expanded due to charging and discharging, electrical contact can be stably maintained by the SWCNTs. Therefore, the composite negative electrode active material of the present invention is preferable in that the occurrence of an electrical short circuit due to the volume expansion of the active material and the resulting degradation of the lifetime of the active material are effectively prevented, the lifetime characteristics of a negative electrode are improved, and since an electrical contact between the active materials is easily maintained by the SWCNTs, resistance is reduced and efficiency is improved.

The average length of the second SWCNT 450 may be 1 μm or more, preferably 3 μm or more, more preferably 4 μm or more, and even more preferably in the range of 4.5 μm to 10 μm. When this range is satisfied, since a conductive network can be smoothly formed between the composite negative electrode active materials by the conductive structure, the problem of an electrical short circuit which may occur between the composite negative electrode active materials can be prevented to a significant degree.

The average diameter of the second SWCNT 450 may be in the range of 0.1 nm to 15 nm and preferably 2 nm to 7 nm. When the average diameter of the second SWCNT satisfies this range, it is preferable in that the breakage of the second SWCNT can be prevented and high flexibility can be secured.

The ratio of the average length and the average diameter of the second SWCNT 450 may be 500:1 or more, preferably in the range of 500:1 to 10,000:1, and more preferably in the range of 750:1 to 2,000:1, and when this range is satisfied, it is preferable in that the second SWCNT can have high conductivity, breakage can be prevented, and flexibility can be improved.

The second SWCNT may be the same as the first SWCNT.

The average length and average diameter of the second SWCNT may be measured in the same manner as the average length and average diameter of the above-described first SWCNT.

The crosslinking material 500 may be bonded to the first SWCNT and at least one of the second SWCNTs. The crosslinking material 500 may be bonded to the first SWCNT and the at least one of the second SWCNTs by a Van der Waals force.

When a conductive network is formed with only SWCNTs without the crosslinking material, there is a concern that since two or more SWCNTs are entangled and clumped together, it may be difficult to smoothly form the conductive network. In addition, when a conductive network is formed with only SWCNTs without the crosslinking material, there is a possibility that the SWCNTs are excessively adsorbed to the silicon-based core particle, making it difficult for the first SWCNTs to protrude. Since the SWCNTs are crosslinked in the composite negative electrode active material of the present invention by the crosslinking material, the entanglement and clumping of the SWCNTs can be prevented, and a broader conductive network can be formed in a negative electrode and maintained.

As shown in FIG. 1, since the crosslinking material 500 is bonded to the first SWCNT 300 and at least one of the second SWCNTs 450, the crosslinking between the first SWCNT 300 and the second SWCNT 450, the crosslinking between two or more first SWCNTs 300, and the crosslinking between two or more second SWCNTs 450 are possible.

Specifically, the crosslinking material 500 may allow the first SWCNT 300 and the second SWCNT 450 to be crosslinked with each other. According to the present invention, one or more second SWCNTs 450 may be crosslinked with the first SWCNT 300 by the crosslinking material 500, and thus the conductive structure 400 and the first SWCNT 300 may be connected to each other. Through this, since the conductive structure 400 can be connected to the outer carbon coating layer 200 by the first SWCNT 300 while being spaced apart from the outer carbon coating layer 200, in the composite negative electrode active material 10, a uniform and stable conductive network can be formed between the active materials, and accordingly, an electrical short circuit, which may occur during the charging and discharging of a negative electrode, can be prevented and lifetime characteristics can be improved.

In addition, the crosslinking material 500 allows two or more first SWCNTs 300 to be crosslinked to each other. As shown in FIG. 1, the first SWCNT 300 may include two or more first SWCNTs 300 crosslinked with each other by the crosslinking material 500. When two or more first SWCNTs 300 are crosslinked, since the conductive structure 400 and the outer carbon coating layer 200 can be more stably connected, a conductive network can be appropriately maintained.

In addition, the crosslinking material 500 allows two or more second SWCNTs 450 to be crosslinked to each other. Specifically, the second SWCNT 450 may include a second SWCNT 450 that is not crosslinked with the first SWCNT 300, and as shown in FIG. 1, two or more second SWCNTs 450 that are not crosslinked with the first SWCNT 300 may be crosslinked with each other by the crosslinking material 500, or such a second SWCNT 450 may be crosslinked with a second SWCNT 450 that is crosslinked with the first SWCNT 300. More specifically, the second SWCNT 450 may include a second SWCNT 450 not crosslinked with the first SWCNT 300, and the second SWCNT 450 not crosslinked with the first SWCNT 300 may be crosslinked with another second SWCNT 450 not crosslinked with the first SWCNT 300, the second SWCNT 450 crosslinked with the first SWCNT 300, or the other second SWCNT 450 not crosslinked with the first SWCNT 300 and the second SWCNT 450 crosslinked with the first SWCNT 300. Therefore, the conductive structure 400 can be extended, and accordingly, a conductive network can be appropriately formed between the active materials, and an effect of preventing an electrical short circuit can be further improved.

As used herein, expressions such as "second SWCNT that is not crosslinked with the first SWCNT" and "another second SWCNT that is not crosslinked with the first SWCNT" are used to specify that the first and second SWCNTs are different SWCNTs that are independent of each other.

The crosslinking material 500 may be one or more selected from the group consisting of carbon black, natural graphite, and artificial graphite and is preferably carbon black in that carbon black has adequate clumping characteristics and thus has excellent adhesive and crosslinking ability with SWCNTs.

The crosslinking material 500 may be spherical. When the crosslinking material is spherical, the crosslinking material can be more easily crosslinked or adhered with SWCNTs, which are linear. Specifically, while the composite negative electrode active material of the present invention can be formed by mixing silicon-based core particles, two or more SWCNTs, a crosslinking material, and a precursor material for an outer carbon coating layer and then thermally treating the mixture, when the crosslinking material is spherical, since it is easier for the crosslinking material to be adhered to the linear SWCNTs than to the silicon-based core particles which may be spherical, the desired conductive network can be more stably formed by the SWCNTs and the crosslinking material. As used herein, the term "spherical" may be understood to include not only a completely spherical shape, but also a substantially spherical shape. Here, "substantially spherical" may be understood as a concept including cases in which the particles are close to being spherical or have the shape of a slightly deformed sphere.

The crosslinking material 500 may be included in the composite negative electrode active material in a combined form in which two or more crosslinking materials are aggregated or bonded, which is preferable in that since the number of sites to which SWCNTs can be bonded increases, two or more SWCNTs can be easily crosslinked.

The crosslinking material 500 may be included in an amount of 0.6 wt % to 5 wt % and preferably 0.8 wt % to 3 wt % in the composite negative electrode active material. When this range is satisfied, two or more SWCNTs can be sufficiently crosslinked by the crosslinking material and the clumping of SWCNTs due to excessive crosslinking can be prevented, and since the degree of freedom of SWCNTs in the composite negative electrode active material is not reduced, a conductive network can be stably maintained.

The average particle diameter ($D_{50}$) of the crosslinking material 500 may be in the range of 0.01 μm to 3 μm and preferably 0.05 μm to 0.5 μm. When this range is satisfied, two or more SWCNTs can be easily crosslinked and adhered to each other, and the clumping of SWCNTs can be prevented.

The sum of the weights of the first SWCNT 300 and the second SWCNT 450 may be 0.04 wt % to 0.7 wt % and preferably 0.055 wt % to 0.45 wt % based on the composite negative electrode active material, and when this range is satisfied, it is preferable in that a phenomenon in which the SWCNTs become entangled with one another due to excessive addition of SWCNTs and cause active materials to be also clumped is prevented, and a conductive network can be formed more uniformly while sufficiently improving conductivity.

The ratio of the sum of the weights of the first SWCNT 300 and the second SWCNT 450 to the weight of the crosslinking material may be in the range of 1:99 to 40:60, preferably 2.5:97.5 to 30:70, and more preferably 10:90 to 25:75, and when this range is satisfied, since an optimal crosslinked structure is formed in a conductive structure, a conductive network can be stably maintained, and the risk of an electrical short circuit of a silicon-based active material due to charging and discharging can be effectively prevented.

As shown in FIG. 1, the composite negative electrode active material 10 of the present invention may additionally include an inner carbon coating layer 600 formed between the surface of the silicon-based core particle 100 and the outer carbon coating layer 200. The inner carbon coating layer 600 may function as a protective layer for suppressing the volume expansion of the silicon-based core particle and preventing side reactions with an electrolyte.

The inner carbon coating layer 600 may be present in an amount of 1 wt % to 10 wt % and preferably 3 wt % to 7 wt % in the composite negative electrode active material 10, and when this range is satisfied, it is preferable in that the inner carbon coating layer 600 can effectively control the volume expansion of the silicon-based core particle 100 and, at the same time, prevent side reactions with an electrolyte.

The inner carbon coating layer 600 may be present in an amount of 1 wt % to 10 wt % and preferably 3 wt % to 7 wt % based on the sum of the weights of the silicon-based core particle 100 and the inner carbon coating layer 600, and when this range is satisfied, it is preferable in that the inner carbon coating layer can effectively control the volume expansion of the silicon-based core particle 100 and, at the same time, prevent side reactions with an electrolyte.

<Method of Manufacturing Composite Negative Electrode Active Material>

Another aspect of the present invention provides a method of manufacturing the above-described composite negative electrode active material.

Specifically, a method of manufacturing the composite negative electrode active material of the present invention includes: mixing silicon-based core particles, a precursor material for forming an outer carbon coating layer, two or more SWCNTs, and a crosslinking material to form a mixture; and thermally treating the mixture.

According to the method of manufacturing the composite negative electrode active material of the present invention, since silicon-based core particles, a precursor material for forming an outer carbon coating layer, two or more SWCNTs, and a crosslinking material are mixed and then thermally treated, an outer carbon coating layer positioned on a silicon-based core particle is formed, and first SWCNTs in contact with the outer carbon coating layer and protruding from the outer carbon coating layer, a conductive structure spaced apart from the outer carbon coating layer and including second SWCNTs, and a crosslinking material bonded to the first SWCNT and at least one of the second SWCNTs can be simultaneously formed. In this case, since the first SWCNT and the at least one of the second SWCNTs are crosslinked by the crosslinking material, the conductive structure and the first SWCNT are connected to each other, and thus the above-described composite negative electrode active material can be manufactured.

The method of manufacturing the composite negative electrode active material of the present invention includes mixing silicon-based core particles, a precursor material for forming an outer carbon coating layer, two or more SWCNTs, and a crosslinking material.

The types, characteristics, amounts, and the like of the silicon-based core particle and the crosslinking material have been described above.

The precursor material for forming an outer carbon coating layer is a material capable of forming an outer carbon coating layer of the composite negative electrode active material.

The precursor material for forming an outer carbon coating layer may be one or more selected from the group consisting of CMC, methyl cellulose (MC), hydroxypropyl cellulose (HPC), methyl hydroxypropyl cellulose (MHPC), ethyl hydroxyethyl cellulose (EHEC), methyl ethyl hydroxyethyl cellulose (MEHEC), and cellulose gum, and is preferably CMC.

In order to manufacture the composite negative electrode active material of the present invention, a process of mixing a crosslinking material with silicon-based core particles, a precursor material for forming an outer carbon coating layer, and two or more SWCNTs is required. When a composite is formed by mixing and thermally treating silicon-based core particles, a precursor material for forming an outer carbon coating layer, and two or more SWCNTs without adding the crosslinking material, there is a problem that since the SWCNTs are attached to the entire silicon-based core and/or outer carbon coating layer surface or excessively attached to the silicon-based core and/or outer carbon coating layer surface, a part of the body of the SWCNTs cannot be spaced apart or cannot protrude from the outer carbon coating layer and therefore, it is difficult to form the first SWCNTs for the composite negative electrode active material of the present invention and allow the conductive structure and the outer carbon coating layer to be connected. In addition, when a composite is formed by mixing and thermally treating silicon-based core particles, a precursor material for forming an outer carbon coating layer, and two or more types of SWCNTs without adding the crosslinking material and then the crosslinking material is added to the composite, since it is likely that the SWCNTs are already attached to the entire silicon-based core and/or outer carbon coating layer surface, a part of the body of the two or more SWCNTs cannot be crosslinked to each other by the crosslinking material, so it is difficult to form the conductive structure according to the present invention.

The method of manufacturing the composite negative electrode active material of the present invention may additionally include forming an inner carbon coating layer on the silicon-based core particle before the mixing step. The inner carbon coating layer is formed on the silicon-based core particle and may function as a protective layer for suppressing the volume expansion of the silicon-based core particle due to charging and discharging and preventing side reactions with an electrolyte.

The step of forming the inner carbon coating layer may be carried out by a chemical vapor deposition (CVD) method and specifically a CVD method using one or more types of hydrocarbon gas selected from the group consisting of methane, ethane, and acetylene. In this way, since an inner carbon coating layer can be uniformly formed on the silicon-based core particle, the volume expansion of the silicon-based core particle can be smoothly controlled, and side reactions due to an electrolyte can be prevented.

The step of forming the inner carbon coating layer may be carried out at a temperature of 800° C. to 1,100° C. and preferably 900° C. to 1,000° C.

Other details of the inner carbon coating layer have been described above.

The method of manufacturing the composite negative electrode active material of the present invention includes thermally treating the above-described mixture. The components of the composite negative electrode active material manufactured by the manufacturing method of the present invention may be combined as a composite by the heat treatment step. When the mixture is not thermally treated, the formation of the outer carbon coating layer, the attachment of the SWCNTs to the outer carbon coating layer, and the crosslinking of the crosslinking material with the SWCNTs cannot be smoothly carried out.

As a result of the heat treatment, an outer carbon coating layer, first SWCNTs, a conductive structure (including second SWCNTs), and a crosslinking material may be formed. In particular, as a result of the heat treatment, some of the SWCNTs included in the mixture may form the first SWCNTs which are in contact with the outer carbon coating layer and protrude from the outer carbon coating layer, and the remainder of the SWCNTs included in the mixture may form the second SWCNTs which form a conductive structure by the crosslinking material. The first SWCNT and at least one of the second SWCNTs may be crosslinked by the crosslinking material, and thus the conductive structure and the first SWCNT may be connected to each other. Additionally, by the crosslinking material, the crosslinking between the first SWCNT and the second SWCNT, the crosslinking between the first SWCNTs, and the crosslinking between the second SWCNTs can be implemented.

Specifically, the heat treatment may be carried out by a spray-drying process. The spray-drying process is a method of spraying a liquid feed while thermally treating or drying the same at high speed with a hot gas to produce a dry powder. When the composite negative electrode active material of the present invention is thermally treated by the spray-drying process, it is preferable in that since the mixture can be thermally treated or dried at high speed, the clumping of particles can be prevented, and the uniformity of the quality of the composite negative electrode active material can be improved, and the excessive adsorption of the SWCNTs to the silicon-based core particles can be prevented.

The spray-drying process may be carried out by a method of spraying the mixture into a drying chamber while injecting a 120° C. to 350° C. inert gas into the drying chamber to thermally treat the mixture.

In the spray-drying process, the inert gas may be one or more types of non-reactive gas selected from the group consisting of helium, nitrogen, and argon.

In the spray-drying process, the temperature of the inert gas may be in the range of 150° C. to 350° C. and preferably 180° C. to 250° C. When the heat treatment is performed within this temperature range, since the SWCNTs can be sufficiently fixed in the carbon coating layer, a conductive network can be uniformly formed in a negative electrode, and the carbonization of the carbon coating layer due to high-temperature heat treatment can be prevented, and since the excessive adsorption of the SWCNTs to the silicon-based core particle can be prevented, the flexibility and degree of freedom of the SWCNTs can be improved.

According to the method of manufacturing the composite negative electrode active material of the present invention, as a result of the heat treatment, the amount of oxygen in the precursor material for forming an outer carbon coating layer may be reduced, and the precursor material for forming an outer carbon coating layer may form an outer carbon coating layer so that a part of the SWCNTs is attached and fixed in the outer carbon coating layer. Specifically, the outer carbon coating layer may contain oxygen in an amount of 35 wt % to 55 wt % and preferably 40 wt % to 55 wt %. When this oxygen content range is satisfied, a part of the SWCNTs can be properly attached and fixed to the outer carbon coating layer, and thus it can be determined that the first SWCNT of the composite negative electrode active material of the present invention has been appropriately formed.

<Negative Electrode>

Still another aspect of the present invention provides a negative electrode including the above-described composite negative electrode active material.

Specifically, a negative electrode of the present invention includes: a negative electrode current collector; and a negative electrode active material layer formed on the negative electrode current collector, and the negative electrode active material layer includes a negative electrode material, a binder, and a conductive material, and the negative electrode material includes the above-described composite negative electrode active material.

The negative electrode current collector is not particularly limited as long as it does not cause a chemical change in the battery and has high conductivity. Specifically, the negative electrode current collector may include one or more selected from the group consisting of copper, stainless steel, aluminum, nickel, titanium, calcined carbon, and an aluminum-cadmium alloy and preferably copper.

The negative electrode current collector may typically have a thickness of 3 to 500 μm.

The negative electrode current collector may have fine irregularities formed in a surface thereof to increase the adhesion of the negative electrode active material. For example, the negative electrode current collector may be used in any of various forms such as a film, a sheet, a foil, a net, a porous material, a foam, and a non-woven fabric.

The negative electrode active material layer is formed on the negative electrode current collector.

The negative electrode active material layer may include a negative electrode material and a binder, and the negative electrode material may include the above-described composite negative electrode active material.

The composite negative electrode active material is present in the negative electrode and may exhibit excellent capacity characteristics, and due to including a conductive network formed by the SWCNTs and the crosslinking material, the composite negative electrode active material may contribute to the improvement of the lifetime characteristics of the negative electrode.

Details of the composite negative electrode active material have been described above.

The negative electrode material may additionally include a carbon-based active material in addition to the above-described composite negative electrode active material. In this case, since the degree of volume expansion of the carbon-based active material due to charging and discharging is low, the overall degree of volume expansion of the negative electrode material can be lowered, and since the carbon-based active material can be surrounded by a conductive network formed in the composite negative electrode active material by the SWCNTs, the addition of the carbon-based active material is preferable in the interest of improving resistance and efficiency.

The carbon-based active material may include one or more selected from the group consisting of artificial graphite, natural graphite, hard carbon, soft carbon, carbon black, acetylene black, Ketjen black, Super P, graphene, and fibrous carbon and preferably one or more selected from the group consisting of artificial graphite and natural graphite.

The particle diameter ($D_{50}$) of the carbon-based active material may be in the range of 5 μm to 35 μm and preferably 10 μm to 20 μm in the interest of securing structural stability during charging and discharging and suppressing side reactions with an electrolyte.

Specifically, it is preferable that both the composite negative electrode active material and the carbon-based active material are used in the negative electrode material in the interest of simultaneously improving capacity characteristics and cycle characteristics, and more specifically, it is preferable that the negative electrode material includes the composite negative electrode active material and the carbon-based active material in a weight ratio ranging from 1:99 to 35:65, preferably 5:95 to 30:70, and more preferably 10:90 to 20:80. When this range is satisfied, it is preferable in that the capacity characteristics and the cycle characteristics are simultaneously improved.

The negative electrode material may be present in an amount of 80 wt % to 99 wt % and preferably 90 wt % to 98.5 wt % in the negative electrode active material layer.

The negative electrode active material layer includes a binder.

The binder may include one or more selected from the group consisting of styrene-butadiene rubber (SBR), acrylonitrile-butadiene rubber, acrylic rubber, butyl rubber, fluororubber, polyvinyl alcohol (PVA), CMC, starch, HPC, regenerated cellulose, polyacrylic acid (PAA), polyethylene glycol (PEG), polyacrylonitrile (PAN), and polyacrylamide (PAM) in the interest of further improving the adhesion of the electrode and imparting sufficient resistance to the volume expansion/contraction of the active material. The binder preferably includes SBR because SBR has high strength, high resistance to the volume expansion/contraction of the silicon-based negative electrode active material, and the ability to prevent the distortion or warping of the electrode by imparting excellent flexibility to the binder.

The binder may be present in an amount of 0.5 wt % to 10 wt % in the negative electrode active material layer, and when this range is satisfied, it is preferable in that the volume expansion of the active material can be more effectively controlled.

When necessary, the negative electrode active material layer may additionally include a conductive material. The conductive material may be used for improving the conductivity of the negative electrode and is preferably a material that does not cause a chemical change in the battery and has conductivity. Specifically, the conductive material may be one or more selected from the group consisting of natural graphite, artificial graphite, carbon black, acetylene black, Ketjen black, channel black, furnace black, lamp black, thermal black, a conductive fiber, fluorocarbon, an aluminum powder, a nickel powder, zinc oxide, potassium titanate, titanium oxide, and a polyphenylene derivative and preferably includes carbon black in the interest of realizing high conductivity.

The conductive material may be present in an amount of 0.5 wt % to 10 wt % in the negative electrode active material layer.

Considering the above-described influence of the SWCNTs and the like, the thickness of the negative electrode active material layer may be in the range of 30 μm to 100 μm and preferably 40 μm to 80 μm in the interest of increasing the electrical contact with components of the negative electrode material.

The negative electrode may be manufactured by preparing a negative electrode slurry by dispersing a negative electrode material, a binder, and a conductive material in a solvent for forming a negative electrode slurry, applying the negative electrode slurry onto the negative electrode current collector, and then carrying out drying and rolling.

The solvent for forming a negative electrode slurry may include one or more selected from the group consisting of distilled water, ethanol, methanol, and isopropyl alcohol and preferably distilled water in the interest of facilitating the dispersion of the components.

<Secondary Battery>

Yet another aspect of the present invention provides a secondary battery including the above-described negative electrode, specifically a lithium secondary battery.

Specifically, a secondary battery of the present invention includes: the above-described negative electrode; a positive electrode opposite to the negative electrode; a separator interposed between the negative electrode and the positive electrode; and an electrolyte.

The positive electrode may include: a positive electrode current collector; and a positive electrode active material layer formed on the positive electrode current collector.

The positive electrode current collector is not particularly limited as long as it does not cause a chemical change in the battery and has conductivity. Specifically, the positive electrode current collector may include one or more selected from the group consisting of copper, stainless steel, aluminum, nickel, titanium, calcined carbon, and an aluminum-cadmium alloy and preferably aluminum.

The positive electrode current collector may typically have a thickness of 3 to 500 μm.

The positive electrode current collector may have fine irregularities formed in a surface thereof to increase the adhesion of the positive electrode active material. For example, the positive electrode current collector may be used in any of various forms such as a film, a sheet, a foil, a net, a porous material, a foam, and a non-woven fabric.

The positive electrode active material layer may include a positive electrode active material.

The positive electrode active material is a compound capable of allowing reversible intercalation and deintercalation of lithium, and may specifically include a lithium transition-metal composite oxide containing lithium and one or more transition metals selected from the group consisting of nickel, cobalt, manganese, and aluminum and preferably a lithium transition-metal composite oxide containing lithium and a transition metal such as nickel, cobalt, and manganese.

More specifically, the lithium transition-metal composite oxide may be a lithium manganese oxide (e.g., $LiMnO_2$, $LiMn_2O_4$, etc.), a lithium cobalt oxide (e.g., $LiCoO_2$, etc.), a lithium nickel oxide (e.g., $LiNiO_2$, etc.), a lithium nickel manganese oxide (e.g., $LiNi_{1-Y}Mn_YO_2$ (here, $0<Y<1$), $LiMn_{2-Z}Ni_ZO_4$ (here, $0<Z<2$), etc.), a lithium nickel cobalt oxide (e.g., $LiNi_{1-Y1}Co_{Y1}O_2$ (here, $0<Y1<1$), etc.), a lithium manganese cobalt oxide (e.g., $LiCo_{1-Y2}Mn_{Y2}O_2$ (here, $0<Y2<1$), $LiMn_{2-Z1}Co_{Z1}O_4$ (here, $0<Z1<2$), etc.), a lithium nickel manganese cobalt oxide (e.g., $Li(Ni_pCo_qMn_{r1})O_2$ (here, $0<p<1$, $0<q<1$, $0<r1<1$, and $p+q+r1=1$), $Li(Ni_pCo_qMn_{r1})O_2$ (here, $0<p1<2$, $0<q1<2$, $0<r2<2$, and $p1+q1+r2=2$), etc.), or a lithium nickel cobalt transition metal (M) oxide (e.g., $Li(Ni_{p2}Co_{q2}Mn_{r3}Ms_2)O_2$ (here, M is selected from the group consisting of Al, Fe, V, Cr, Ti, Ta, Mg, and Mo, and for p2, q2, r3, and s2, which are atomic fractions of elements which are independent of one another, $0<p2<1$, $0<q2<1$, $0<r3<1$, $0<s2<1$, and $p2+q2+r3+s2=1$), etc.), or the like, and any one or more of these compounds may be included. Among these, the lithium transition-metal composite oxide may be $LiCoO_2$, $LiMnO_2$, $LiNiO_2$, a lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, etc.), a lithium nickel cobalt aluminum oxide (e.g., $Li(Ni_{0.8}Co_{0.15}Al_{0.05})O_2$, etc.), or the like in the interest of improving the capacity characteristics and stability of a battery, and considering that the control of the types and content ratios of lithium transition-metal composite oxide constituent elements has a great effect on improving the capacity characteristics and stability of a battery, the lithium transition-metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like, and any one or a combination of two or more thereof may be used.

The positive electrode active material may be present in an amount of 80 wt % to 99 wt % and preferably 92 wt % to 98.5 wt % in the positive electrode active material layer in the interest of allowing the positive electrode active material to exhibit sufficient capacity.

The positive electrode active material layer may include a binder and/or a conductive material in addition to the above-described positive electrode active material.

The binder is a component that aids in the binding of the active material, a conductive material, and the like to one another and to a current collector, and specifically, the binder may include one or more selected from the group consisting of polyvinylidene fluoride, PVA, CMC, starch, HPC, regenerated cellulose, polyvinylpyrrolidone, polytetrafluoroethylene, polyethylene, polypropylene, an ethylene-propylene-diene monomer (EPDM), a sulfonated EPDM, SBR, and fluororubber and preferably polyvinylidene fluoride.

The binder may be present in an amount of 1 wt % to 20 wt % and preferably 1.2 wt % to 10 wt % in the positive electrode active material layer in the interest of securing sufficient binding between components such as the positive electrode active material.

The conductive material may be used for supplementing and improving the conductivity of the secondary battery, and is not particularly limited as long as it does not cause a chemical change in the battery and has conductivity. Specifically, the conductive material may include one or more selected from the group consisting of: graphite such as natural graphite or artificial graphite; carbon black such as acetylene black, Ketjen black, channel black, furnace black, lamp black, or thermal black; a conductive fiber such as a carbon fiber or a metal fiber; a conductive tube such as a carbon nanotube; fluorocarbon; a metal powder such as an aluminum powder or a nickel powder; a conductive whisker such as zinc oxide or potassium titanate; a conductive metal oxide such as titanium oxide; and a polyphenylene derivative and preferably includes carbon black in the interest of improving conductivity.

The conductive material may be present in an amount of 1 wt % to 20 wt % and preferably 1.2 wt % to 10 wt % in the positive electrode active material layer in the interest of securing sufficient electrical conductivity.

The thickness of the positive electrode active material layer may be in the range of 30 μm to 400 μm and preferably 50 μm to 110 μm.

The positive electrode may be manufactured by applying a positive electrode slurry including a positive electrode active material and optionally including a binder, a conductive material, and a solvent for forming a positive electrode slurry onto the positive electrode current collector, and then carrying out drying and rolling.

The solvent for forming a positive electrode slurry may include an organic solvent such as N-methyl-2-pyrrolidone (NMP) and may be used in an amount that results in a desirable viscosity when the positive electrode active material and optionally a binder, a conductive material, and the like are added. For example, in the positive electrode slurry, the solvent for forming a positive electrode slurry may be included in an amount such that the concentration of a solid content including the positive electrode active material and optionally a binder and a conductive material is in the range of 50 wt % to 95 wt % and preferably 70 wt % to 90 wt %.

The separator is used to separate the negative electrode and the positive electrode and provide a passage for lithium ion migration. As the separator, a separator commonly used in a secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, or an ethylene/methacrylate copolymer or a stacked structure having two or more layers thereof, may be used. In addition, a common porous non-woven fabric, for example, a non-woven fabric made of high-melting-point glass fiber, polyethylene terephthalate fiber, or the like, may be used.

Also, in order to ensure heat resistance or mechanical strength, a coated separator that includes a ceramic component or polymer material and is optionally in a single-layer or multi-layer structure may be used.

In addition, examples of the electrolyte used in the present invention may include an organic liquid electrolyte, an inorganic liquid electrolyte, a solid polymer electrolyte, a gel-type polymer electrolyte, an inorganic solid electrolyte, a molten-type inorganic electrolyte, and the like which are usable for manufacturing a secondary battery, but the present invention is not limited thereto.

Specifically, the electrolyte may include an organic solvent and a lithium salt.

As the organic solvent, any organic solvent that can serve as a medium through which ions involved in the electrical reaction of a battery can move may be used without particular limitation. Specifically, as the organic solvent, an ester-based solvent such as methyl acetate, ethyl acetate, gamma-butyrolactone, or ε-caprolactone, an ether-based solvent such as dibutyl ether or tetrahydrofuran, a ketone-based solvent such as cyclohexanone, an aromatic hydrocarbon-based solvent such as benzene or fluorobenzene, a carbonate-based solvent such as dimethyl carbonate (DMC), diethyl carbonate (DEC), ethyl methyl carbonate (EMC), ethylene carbonate (EC), or propylene carbonate (PC), an alcohol-based solvent such as ethyl alcohol or isopropyl alcohol, a nitrile such as R—CN (R is a C2-C20 linear, branched, or cyclic hydrocarbon and may contain a double-bonded aromatic ring or an ether bond), an amide such as dimethylformamide, a dioxolane such as 1,3-dioxolane, a sulfolane, or the like may be used. Among these, a carbonate-based solvent is preferable, and a mixture of a cyclic carbonate having high ionic conductivity and a high dielectric constant, which is capable of improving the charging/discharging performance of a battery (e.g., ethylene carbonate, propylene carbonate, etc.), and a linear carbonate compound having low viscosity (e.g., ethyl methyl carbonate, dimethyl carbonate, diethyl carbonate, etc.) is more preferable. In this case, when the cyclic carbonate and the chain carbonate are mixed in a volume ratio ranging from about 1:1 to about 1:9 and used, the performance of the electrolyte can be excellent.

As the lithium salt, any compound capable of providing lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably used at a concentration within the range of 0.1 to 2.0 M. When the concentration of the lithium salt satisfies this range, since the electrolyte has appropriate conductivity and viscosity, the performance of the electrolyte can be excellent, and the lithium ions can effectively move.

The secondary battery may be manufactured according to a conventional method for manufacturing a secondary battery, by interposing a separator between the above-described negative electrode and positive electrode and then injecting an electrolyte.

The secondary battery of the present invention is useful in the field of portable devices such as mobile phones, laptop computers, and digital cameras and electric vehicles (EVs) such as hybrid electric vehicles (HEVs), and is particularly preferably useful as a constituent battery for a medium-to-large-sized battery module. Therefore, the present invention also provides a medium-to-large-sized battery module including the secondary battery as a unit battery.

Such a medium-to-large-sized battery module is preferably applicable to a power source requiring high output and large capacity, such as an EV, an HEV, or a power storage device.

Hereinafter, exemplary embodiments of the present invention will be described in detail so that those of ordinary skill in the art can easily implement the present invention. However, the present invention may be implemented in various different forms and is not limited to the embodiments described herein.

EXAMPLES

Example 1: Manufacture of Composite Negative Electrode Active Material

As silicon-based core particles, $Mg_{0.1}SiO$ particles (average particle diameter ($D_{50}$): 6 μm) doped with Mg were provided.

Methane, which is a hydrocarbon gas, was deposited on the silicon-based core particles by CVD at 950° C., forming an inner carbon coating layer on the silicon-based core particle. The formed inner carbon coating layer had a weight of 5 wt % based on the total weight of the silicon-based core particle and the inner carbon coating layer.

The silicon-based core particles on which the inner carbon coating layer was formed, CMC as a precursor material for forming an outer carbon coating layer, SWCNTs, and spherical carbon black (average particle diameter ($D_{50}$): 0.1 μm) as a crosslinking material were mixed in a weight ratio of 98.85:0.09:0.06:1.00.

The SWCNTs had an average length of 5 μm and an average diameter of 5 nm, and the ratio of the average length to the average diameter was 1,000.

The above mixture was thermally treated by a spray-drying method. Specifically, the mixture was sprayed into a drying chamber through a sprayer while injecting 200° C. argon gas into the drying chamber and thus was thermally treated at high speed. The thermally-treated mixture was collected to obtain a composite negative electrode active material of Example 1.

In the composite negative electrode active material of Example 1, an outer carbon coating layer was formed on the inner carbon coating layer, some of the SWCNTs formed first SWCNTs which are in contact with the outer carbon coating layer and protrude from the outer carbon coating layer, and as the remainder of the SWCNTs formed second SWCNTs which are spaced apart from the outer carbon coating layer, a conductive structure was formed. As the first SWCNTs were crosslinked with at least one of the second SWCNTs by the crosslinking material, the first SWCNTs became connected with the conductive structure. In addition, the first SWCNTs were crosslinked with each other and the second SWCNTs were crosslinked with each other through the crosslinking material.

The composite negative electrode active material included the silicon-based core particle on which the inner carbon coating layer was formed, the outer carbon coating layer, the SWCNTs (the first SWCNTs and the second SWCNTs), and the crosslinking material in a weight ratio of 98.87:0.07:0.06:1.

In addition, an oxygen content in the outer carbon coating layer was 45 wt % based on the total weight of the outer carbon coating layer. The oxygen content in the outer carbon coating layer was determined through XPS depth profiling. Using an XPS depth profile, the boundary between the inner carbon coating layer and the outer carbon coating layer was determined based on whether or not oxygen was detected, and the oxygen content in the outer carbon coating layer was determined.

Example 2: Manufacture of Composite Negative Electrode Active Material

A composite negative electrode active material of Example 2 was manufactured in the same manner as in Example 1 except that the silicon-based core particles on which an inner carbon coating layer was formed, CMC as a precursor material for forming an outer carbon coating layer, SWCNTs, and spherical carbon black (average particle diameter ($D_{50}$): 0.1 μm) as a crosslinking material were mixed in a weight ratio of 98.25:0.45:0.30:1.00.

The composite negative electrode active material included the silicon-based core particle on which the inner carbon coating layer was formed, an outer carbon coating layer, the SWCNTs (first SWCNTs and second SWCNTs), and the crosslinking material in a weight ratio of 98.34:0.36:0.30:1.

Example 3: Manufacture of Composite Negative Electrode Active Material

A composite negative electrode active material of Example 3 was manufactured in the same manner as in Example 1 except that the silicon-based core particles on which an inner carbon coating layer was formed, CMC as a precursor material for forming an outer carbon coating layer, SWCNTs, and spherical carbon black (average particle diameter ($D_{50}$): 0.1 μm) as a crosslinking material were mixed in a weight ratio of 97.85:0.09:0.06:2.00.

The composite negative electrode active material included the silicon-based core particle on which the inner carbon coating layer was formed, an outer carbon coating layer, the SWCNTs (first SWCNTs and second SWCNTs), and the crosslinking material in a weight ratio of 97.87:0.07:0.06:2.

Example 4: Manufacture of Composite Negative Electrode Active Material

A composite negative electrode active material of Example 4 was manufactured in the same manner as in Example 1 except that the silicon-based core particles on which an inner carbon coating layer was formed, CMC as a precursor material for forming an outer carbon coating layer, SWCNTs, and spherical carbon black (average particle diameter ($D_{50}$): 0.1 μm) as a crosslinking material were mixed in a weight ratio of 97.5:0.9:0.6:1.0.

The composite negative electrode active material included the silicon-based core particle on which the inner carbon coating layer was formed, an outer carbon coating layer, the SWCNTs (first SWCNTs and second SWCNTs), and the crosslinking material in a weight ratio of 97.68:0.72:0.60:1.

Example 5: Manufacture of Composite Negative Electrode Active Material

A composite negative electrode active material of Example 5 was manufactured in the same manner as in Example 1 except that the silicon-based core particles on which an inner carbon coating layer was formed, CMC as a precursor material for forming an outer carbon coating layer, SWCNTs, and spherical carbon black (average particle diameter ($D_{50}$): 0.1 μm) as a crosslinking material were mixed in a weight ratio of 98.8875:0.0675:0.0450:1.0000.

The composite negative electrode active material included the silicon-based core particle on which the inner carbon coating layer was formed, an outer carbon coating layer, the SWCNTs (first SWCNTs and second SWCNTs), and the crosslinking material in a weight ratio of 98.90:0.05:0.05:1.

Example 6: Manufacture of Composite Negative Electrode Active Material

A composite negative electrode active material of Example 6 was manufactured in the same manner as in Example 1 except that the silicon-based core particles on which an inner carbon coating layer was formed, CMC as a precursor material for forming an outer carbon coating layer, SWCNTs, and spherical carbon black (average particle diameter ($D_{50}$): 0.1 μm) as a crosslinking material were mixed in a weight ratio of 95.85:0.09:0.06:4.00.

The composite negative electrode active material included the silicon-based core particle on which the inner carbon coating layer was formed, an outer carbon coating layer, the SWCNTs (first SWCNTs and second SWCNTs), and the crosslinking material in a weight ratio of 95.87:0.07:0.06:4.

Example 7: Manufacture of Composite Negative Electrode Active Material

A composite negative electrode active material of Example 7 was manufactured in the same manner as in Example 1 except that the silicon-based core particles on which an inner carbon coating layer was formed, CMC as a precursor material for forming an outer carbon coating layer, SWCNTs, and spherical carbon black (average particle diameter ($D_{50}$): 0.1 μm) as a crosslinking material were mixed in a weight ratio of 99.15:0.09:0.06:0.70.

The composite negative electrode active material included the silicon-based core particle on which the inner carbon coating layer was formed, an outer carbon coating layer, the SWCNTs (first SWCNTs and second SWCNTs), and the crosslinking material in a weight ratio of 99.17:0.07:0.06:0.70.

Comparative Example 1: Manufacture of Negative Electrode Active Material

The silicon-based core particles used in Example 1, on which an inner carbon coating layer was formed, CMC as a precursor material for forming an outer carbon coating layer, SWCNTs, and spherical carbon black (average particle diameter ($D_{50}$): 0.1 μm) as a crosslinking material were mixed in a weight ratio of 98.85:0.09:0.06:1.00, and thereby a negative electrode active material of Comparative Example 1 was obtained. In the case of the negative electrode active material of Comparative Example 1, since heat treatment was not performed, a conductive structure and an outer carbon coating layer were not formed.

Comparative Example 2: Manufacture of Negative Electrode Active Material

A negative electrode active material of Comparative Example 2 was manufactured in the same manner as in Example 1 except that the silicon-based core particles on which an inner carbon coating layer was formed, CMC as a precursor material for forming an outer carbon coating layer, and SWCNTs were mixed in a weight ratio of 99.85:0.09:0.06 and a crosslinking material was not used.

In the case of the negative electrode active material of Comparative Example 2, since the SWCNTs in the negative electrode active material were attached to the entire surface of the negative electrode active material and a crosslinking material for crosslinking two or more SWCNTs to each other was not used, a conductive structure was not formed.

Comparative Example 3: Manufacture of Negative Electrode Active Material

A negative electrode active material of Comparative Example 3 was manufactured in the same manner as in Example 1 except that the silicon-based core particles on which an inner carbon coating layer was formed and carbon black (average particle diameter ($D_{50}$): 0.1 μm) were mixed in a weight ratio of 99:1 and a precursor material for forming an outer carbon coating layer and SWCNTs were not used.

In the case of the negative electrode active material of Comparative Example 3, an outer carbon coating layer and a conductive network formed by SWCNTs were not formed.

Comparative Example 4: Manufacture of Negative Electrode Active Material

A negative electrode active material was manufactured by performing heat treatment in the same manner as in Example 1 except that the silicon-based core particles on which an inner carbon coating layer was formed, CMC as a precursor material for forming an outer carbon coating layer, and SWCNTs were mixed in a weight ratio of 98.85:0.09:0.06 and a crosslinking material was not used. The negative electrode active material included the silicon-based core particle, an outer carbon coating layer, and the SWCNTs in a weight ratio of 98.87:0.07:0.06.

Subsequently, the negative electrode active material and the crosslinking material used in Example 1 were mixed in a weight ratio of 99:1 and used as a negative electrode active material of Comparative Example 4.

As will be described below, in the case of Comparative Example 4, since heat treatment was performed without a crosslinking material, the SWCNTs were attached to the entire outer carbon coating layer, and therefore, even after a crosslinking material was separately added, the crosslinked structure and conductive structure pursued in the present invention could not be formed.

Here, the average length and average diameter of the SWCNTs were measured by the methods described below.

1) Average Length

A solution in which the SWCNTs and CMC used in Examples and Comparative Examples, in a weight ratio of 40:60, were added to water (solid content is 1 wt % based on the total weight of the solution) was diluted 1,000× in water. Subsequently, 20 ml of the diluted solution was passed through a filter, and the filter containing SWCNT residue was dried. After 100 images of the dried filter were taken with an SEM, the lengths of the SWCNTs were measured using ImageJ software, and an average value of the lengths was taken as the average length of the SWCNTs.

2) Average Diameter

A solution in which the SWCNTs and CMC used in Examples and Comparative Examples, in a weight ratio of 40:60, were added to water (solid content is 1 wt % based on the total weight of the solution) was diluted 1,000× in water. One drop of the diluted solution was applied onto a TEM grid, and the TEM grid was dried. The dried TEM grid was observed with a TEM instrument (H7650 manufactured by Hitachi High-Tech Corporation), and the average diameter of the SWCNTs was measured.

Experimental Example

Experimental Example 1: Evaluation Based on SEM Observation

<Manufacture of Negative Electrode>

The composite negative electrode active material manufactured in Example 1 and natural graphite (average particle diameter ($D_{50}$): 15 μm) as a carbon-based active material were mixed in a weight ratio of 15:85 and provided as a negative electrode material.

The negative electrode material, SBR as a binder, and CMC as a thickener were mixed in a weight ratio of 98:1:1 and added to distilled water used as a solvent for forming a negative electrode slurry, and thereby a negative electrode slurry was obtained.

After the negative electrode slurry was applied, with a loading amount of 3 mAh/cm$^2$, onto one side of a copper current collector (thickness: 15 μm) used as a negative electrode current collector, the slurry was roll-pressed and then dried in a 130° C. vacuum oven for 10 hours to form a negative electrode active material layer (thickness: 42 μm), and the resultant was used as a negative electrode of Example 1 (negative electrode thickness: 57 μm: 1.4875 cm$^2$, circular).

In addition, a negative electrode of Comparative Example 4 was manufactured in the same manner as in Example 1 except that the negative electrode active material of Comparative Example 4 was used instead of the composite negative electrode active material of Example 1.

<SEM Observation>

The negative electrodes manufactured in Example 1 and Comparative Example 4 were observed with an SEM (manufactured by JEOL Ltd.).

Figure 2:
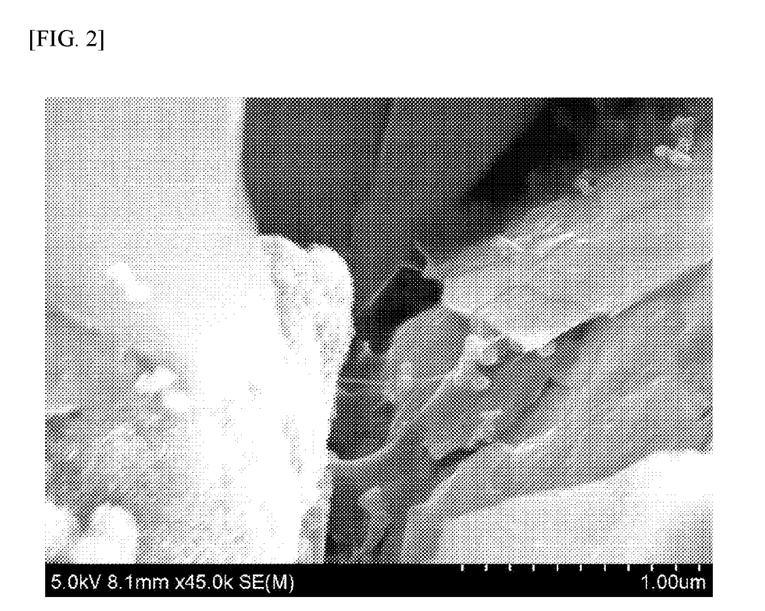
FIG. 2 is a scanning electron microscope (SEM) image of a negative electrode of Example 1.
Figure 3:
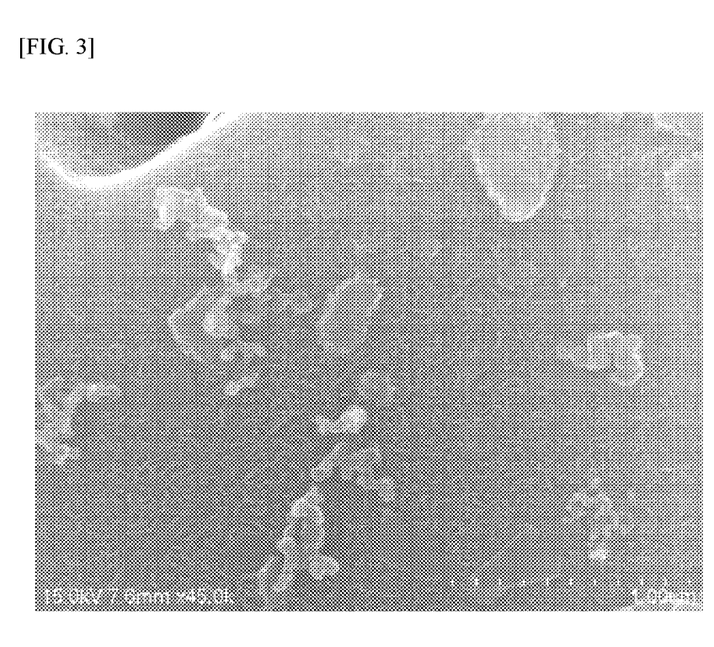
FIG. 3 is an SEM image of a negative electrode of Comparative Example 4.

An SEM image of the negative electrode of Example 1 is shown in FIG. 2, and an SEM image of the negative electrode of Comparative Example 4 is shown in FIG. 3.

Referring to FIGS. 2 and 3, it can be seen that in the composite negative electrode active material of Example 1, first SWCNTs were formed such that a part of the body thereof is in contact with an outer carbon coating layer and the remainder of the body that is not in contact with the outer carbon coating layer is spaced apart and protrudes from the outer carbon coating layer, and the first SWCNTs and second SWCNTs were crosslinked to one another by the crosslinking material, and thus a conductive structure was formed. On the other hand, it can be seen that, based on the observation that the SWCNTs are attached to the entire surface of an outer carbon coating layer and the carbon black is independently present in the negative electrode active material of Comparative Example 4, the conductive structure and crosslinked structure pursued in the present invention were not formed.

Experimental Example 2: Evaluation of Lifetime Characteristics

<Manufacture of Negative Electrode>

The composite negative electrode active material manufactured in Example 1 and natural graphite (average particle diameter ($D_{50}$): 15 μm) as a carbon-based active material were mixed in a weight ratio of 15:85 and provided as a negative electrode material.

The negative electrode material, SBR as a binder, and CMC as a thickener were mixed in a weight ratio of 98:1:1 and added to distilled water used as a solvent for forming a negative electrode slurry, and thereby a negative electrode slurry was obtained.

After the negative electrode slurry was applied, with a loading amount of 3 mAh/cm², onto one side of a copper current collector (thickness: 15 μm) used as a negative electrode current collector, the slurry was roll-pressed and then dried in a 130° C. vacuum oven for 10 hours to form a negative electrode active material layer (thickness: 42 μm), and the resultant was used as a negative electrode of Example 1 (negative electrode thickness: 57 μm, area: 1.4875 cm², circular).

In addition, negative electrodes of Examples 2 to 7 and Comparative Examples 1 to 4 were manufactured in the same manner as in Example 1 except that the composite negative electrode active materials of Examples 2 to 7 and Comparative Examples 1 to 4 were respectively used instead of the composite negative electrode active material of Example 1.

<Manufacture of Secondary Battery>

A circular lithium-metal thin film having an area of 1.7671 cm² was used as a positive electrode.

After a porous polyethylene separator was interposed between each of the negative electrodes manufactured in Examples 1 to 7 and Comparative Examples 1 to 4 and the positive electrode, an electrolyte was injected, and thereby a coin-type secondary half-cell was manufactured.

As the electrolyte, a solution prepared by dissolving, in a solvent in which EMC and EC are mixed in a volume ratio of 7:3, vinylene carbonate (VC) at a concentration of 0.5 wt % and then $LiPF_6$ at a concentration of 1 M was used.

<Evaluation of Capacity Retention Rate>

Cycle capacity retention rates of the secondary batteries manufactured in Examples 1 to 7 and Comparative Examples 1 to 4 were evaluated using an electrochemical charger/discharger.

The cycle capacity retention rates were evaluated while charging and discharging at 0.1 C in the first and second cycles and at 0.5 C from the third cycle (charging conditions: CC/CV, 5 mV/0.005 C cut-off; discharging conditions: CC, 1.5 V cut-off)

The capacity retention rates were calculated as follows.

Capacity retention rate (%)={(Discharge capacity at $N^{th}$ cycle)/(Discharge capacity at first cycle)}× 100

(Here, N is an integer greater than or equal to 1)

The capacity retention rates at the 50th cycle (%) are shown in the following Table 1.

TABLE 1

| | Capacity retention rate at $50^{th}$ cycle (%) |
|---|---|
| Example 1 | 97.5 |
| Example 2 | 98.1 |
| Example 3 | 97.4 |
| Example 4 | 92.3 |
| Example 5 | 92.0 |
| Example 6 | 92.9 |
| Example 7 | 93.8 |

TABLE 1-continued

| | Capacity retention rate at $50^{th}$ cycle (%) |
|---|---|
| Comparative Example 1 | 84.9 |
| Comparative Example 2 | 89.9 |
| Comparative Example 3 | 79.5 |
| Comparative Example 4 | 88.9 |

Referring to Table 1, it can be seen that as compared to Comparative Examples 1 to 4, the negative electrodes and secondary batteries of Examples 1 to 7, in which a composite negative electrode active material was used, exhibit improved, excellent cycle capacity retention rates.

DESCRIPTION OF REFERENCE NUMERALS

10: composite negative electrode active material
100: silicon-based core particle
200: outer carbon coating layer
300: first single-walled carbon nanotube
400: conductive structure
450: second single-walled carbon nanotube
500: crosslinking material
600: inner carbon coating layer

The invention claimed is:

1. A composite negative electrode active material, comprising:
    a silicon-based core particle;
    an outer carbon coating layer positioned on a surface of the silicon-based core particle;
    first single-walled carbon nanotubes in contact with the outer carbon coating layer, wherein the first single-walled carbon nanotubes protrude from the outer carbon coating layer;
    a conductive structure spaced apart from the outer carbon coating layer,
    wherein the conductive structure comprises at least one second single-walled carbon nanotubes; and
    a crosslinking material bonded to the first single-walled carbon nanotube and at least one of the second single-walled carbon nanotubes,
    wherein the at least one of the second single-walled carbon nanotubes is crosslinked with the first single-walled carbon nanotube by the crosslinking material, and
    wherein the conductive structure and the first single-walled carbon nanotube are connected to each other.

2. The composite negative electrode active material of claim 1, wherein the silicon-based core particle comprises a compound represented by the following Chemical Formula 1:

$$M_xSiO_y,$$ [Chemical Formula 1]

wherein, in Chemical Formula 1, M is one or more selected from the group consisting of Li, Mg, and Al, and 0≤x≤0.4, and 0≤y<2.

3. The composite negative electrode active material of claim 1, further comprising an inner carbon coating layer formed between the surface of the silicon-based core particle and the outer carbon coating layer.

4. The composite negative electrode active material of claim 1, wherein a sum of weights of the first single-walled carbon nanotubes and the second single-walled carbon nanotubes is 0.04 wt % to 0.7 wt % based on the composite negative electrode active material.

5. The composite negative electrode active material of claim 1, wherein the crosslinking material is at least one selected from the group consisting of carbon black, natural graphite, and artificial graphite.

6. The composite negative electrode active material of claim 1, wherein the crosslinking material is present in an amount of 0.6 wt % to 5 wt % in the composite negative electrode active material.

7. The composite negative electrode active material of claim 1, wherein the crosslinking material is spherical.

8. The composite negative electrode active material of claim 1, wherein an average particle diameter ($D_{50}$) of the crosslinking material is in a range of 0.01 μm to 3 μm.

9. The composite negative electrode active material of claim 1, wherein a ratio of a sum of weights of the first single-walled carbon nanotubes and the second single-walled carbon nanotubes to a weight of the crosslinking material is in a range of 1:99 to 40:60.

10. A method of manufacturing the composite negative electrode active material of claim 1, comprising:
mixing silicon-based core particles, a precursor material for forming the outer carbon coating layer, at least two single-walled carbon nanotubes, and the crosslinking material to form a mixture; and
thermally treating the mixture.

11. The method of claim 10, wherein thermally treating the mixture is carried out by a spray-drying process.

12. The method of claim 10, wherein the precursor material for forming the outer carbon coating layer is at least one selected from the group consisting of carboxymethyl cellulose, methyl cellulose, hydroxypropyl cellulose, methyl hydroxypropyl cellulose, ethyl hydroxyethyl cellulose, methyl ethyl hydroxyethyl cellulose, and cellulose gum.

13. The method of claim 10, further comprising, before mixing, forming the inner carbon coating layer on the silicon-based core particle,
wherein forming of the inner carbon coating layer is carried out by a chemical vapor deposition (CVD) method using at least one type of hydrocarbon gas selected from the group consisting of methane, ethane, and acetylene.

14. A negative electrode comprising:
a negative electrode current collector; and
a negative electrode active material layer formed on the negative electrode current collector,
wherein the negative electrode active material layer comprises:
a negative electrode material comprising the composite negative electrode active material of claim 1;
a binder; and
a conductive material.

15. The negative electrode of claim 14, wherein the negative electrode material further comprises a carbon-based active material, and the negative electrode material comprises the composite negative electrode active material and the carbon-based active material in a weight ratio ranging from 1:99 to 35:65.

* * * * *